United States Patent [19]
Lee et al.

[11] Patent Number: 5,947,197
[45] Date of Patent: Sep. 7, 1999

[54] KIMCHI STORAGE DEVICE AND METHOD FOR MATURING AND PRESERVING KIMCHI THEREIN

[75] Inventors: Young-Gil Lee, Asan-shi; Jae-Wook Nam, Seoul; Beom-Geol Ryu, Pyongtaek-shi; Won-Keun Lee, Asan-shi; Hee-Seub Kim, Masan-shi, all of Rep. of Korea

[73] Assignee: Mando Machinery Corporation, Rep. of Korea

[21] Appl. No.: 08/580,016

[22] Filed: Dec. 20, 1995

[30] Foreign Application Priority Data

| Dec. 20, 1994 | [KR] | Rep. of Korea | 94-34630 |
| Dec. 20, 1994 | [KR] | Rep. of Korea | 94-35246 |
| Dec. 20, 1994 | [KR] | Rep. of Korea | 94-35247 |
| Dec. 20, 1994 | [KR] | Rep. of Korea | 94-35248 |
| May 10, 1995 | [KR] | Rep. of Korea | 95-11348 |
| Jun. 29, 1995 | [KR] | Rep. of Korea | 95-18054 |

[51] Int. Cl.$^6$ .................................................. F25B 29/00
[52] U.S. Cl. ......................... 165/206; 165/263; 165/64; 165/48.1; 62/447; 62/253; 62/254; 62/DIG. 13; 219/530; 219/531; 99/470; 99/483; 99/468; 99/486
[58] Field of Search ............................. 165/263, 264, 165/259, 206, 64, 48.1; 219/530, 531; 62/447, 254, 253, DIG. 13; 99/470, 483, 468, 486

[56] References Cited

U.S. PATENT DOCUMENTS

| 2,047,326 | 7/1936 | King | 62/447 |
| 2,432,042 | 12/1947 | Richard | 62/DIG. 13 |
| 2,504,794 | 4/1950 | Berman et al. | 165/64 |
| 2,517,234 | 8/1950 | Phelan | 62/447 |
| 2,560,488 | 7/1951 | Smith | 165/263 |
| 2,566,340 | 9/1951 | Kogel | 62/447 |
| 2,738,656 | 3/1956 | Phillip | 62/447 |
| 3,516,485 | 6/1970 | Rhoads et al. | 165/48.1 |
| 5,398,599 | 3/1995 | Woo | 165/263 |
| 5,458,186 | 10/1995 | Lee et al. | 165/263 |
| 5,752,568 | 5/1998 | Lee | 165/263 |

*Primary Examiner*—John K. Ford
*Attorney, Agent, or Firm*—Anderson Kill & Olick

[57] ABSTRACT

A kimchi storage device capable of fast fermenting kimchi, and once kimchi has been adequately fermented, of functioning as a cold storage therefor includes a main body provided with a refrigeration unit and a plurality of kimchi storage chambers, a heater and an evaporator installed on inner side walls in each of the kimchi storage chambers, at least one high and one low temperature sensors in each of the kimchi storage chambers and a control unit for controlling the evaporator and the heater in each of the kimchi storage chambers.

8 Claims, 14 Drawing Sheets

KIMCHI STORAGE DEVICE AND METHOD FOR MATURING AND PRESERVING KIMCHI THEREIN

FIELD OF THE INVENTION

The present invention relates to a food storage device; and, more particularly, to an improved kimchi storage device and a method for maturing and preserving kimchi optimally to ensure an optimum taste thereof.

DESCRIPTION OF THE PRIOR ART

Figure 1:
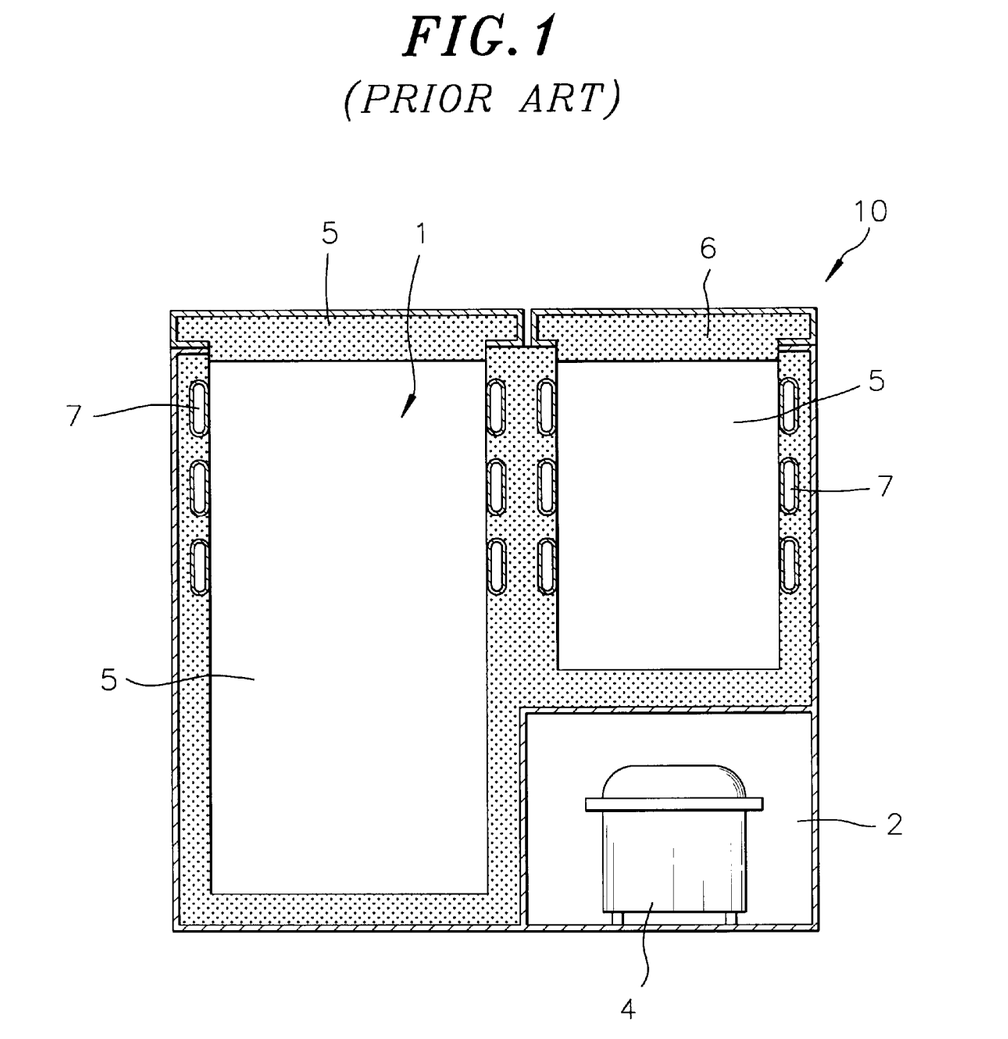
FIG. 1 illustrates a cross sectional view of a conventional kimchi storage device.

There is illustrated in FIG. 1 a cross sectional view of a conventional kimchi storage device 10 including a main body 1 provided with a refrigeration chamber 2, located at a bottom thereof and containing a refrigeration unit 4, and a plurality of kimchi storage chambers 5, wherein each of the kimchi storage chambers 5 is made of a heat insulating material and is provided with a door 6 at a top thereof and an evaporator 7 on inner side walls thereof, the evaporator in each of the kimchi storage chambers 5 being connected to the refrigeration unit 4 in the refrigeration chamber 2.

In such a device 10, a refrigerant circulates continuously between the refrigeration unit 4 and the evaporator 7 in each of the kimchi storage chambers 5, wherein the evaporator 7 removes heat from the respective kimchi storage chamber 5 to thereby keep the respective kimchi storage chamber 5 at a desired lower temperature. In other words, the primary function of the conventional kimchi storage device 10 is to function as a cold storage for kimchi, slowing down the natural fermenting of kimchi and keeping kimchi from going sour, i.e., oxidizing. Further, in case of the prior art kimchi storage device 10, since the evaporator 7 in each of the kimchi storage chambers 5 comes into a direct contact with kimchi, kimchi may become frozen.

SUMMARY OF THE INVENTION

It is, therefore, a primary object of the present invention to provide a kimchi storage device capable of fermenting kimchi expeditiously, and once kimchi has adequately matured, of functioning as a cold storage therefor, slowing down further fermentation thereof and keep kimchi from going sour, i.e., oxidizing.

It is another object of the present invention to provide a kimchi storage device capable of preventing kimchi from fermenting unevenly and also from freezing.

It is still another object of the present invention to provide a method for fermenting and storing kimchi to obtain an optimum taste.

In accordance with one aspect of the present invention, there is provided with a kimchi storage device comprising: a main body including a refrigerating unit on a bottom portion thereof and a plurality of kimchi storage chambers made of an insulating material; a door for each of the kimchi storage chambers; at least one high temperature sensor and one low temperature sensor for each of the kimchi storage chambers; an evaporator installed on an inner side wall of each of the kimchi storage chambers; a heater installed on an inner side wall in each of the kimchi storage chambers; and a control unit for controlling the heater and the evaporator in each of the kimchi storage chambers.

In accordance with another aspect of the present invention, there is provided a method for fermenting and storing a freshly made kimchi to obtain an optimum taste, the method comprising the steps of: (a) holding the freshly made kimchi at a temperature ranging from 20° C. to 25° C. for 6 to 12 hours, thereby semi-fermenting it; (b) holding the semi-fermented kimchi at a temperature ranging from 7° C. to 12° C. for 1 to 3 days, thereby completely fermenting it; and (c) holding the fermented kimchi at 2° C. to −3° C.

BRIEF DESCRIPTION OF THE DRAWINGS

The above and other objects and features of the present invention will become apparent from the following description of preferred embodiments, when given in conjunction with the accompanying drawings, wherein.

DETAILED DESCRIPTION OF THE PREFERRED EMBODIMENTS

Figure 2A:
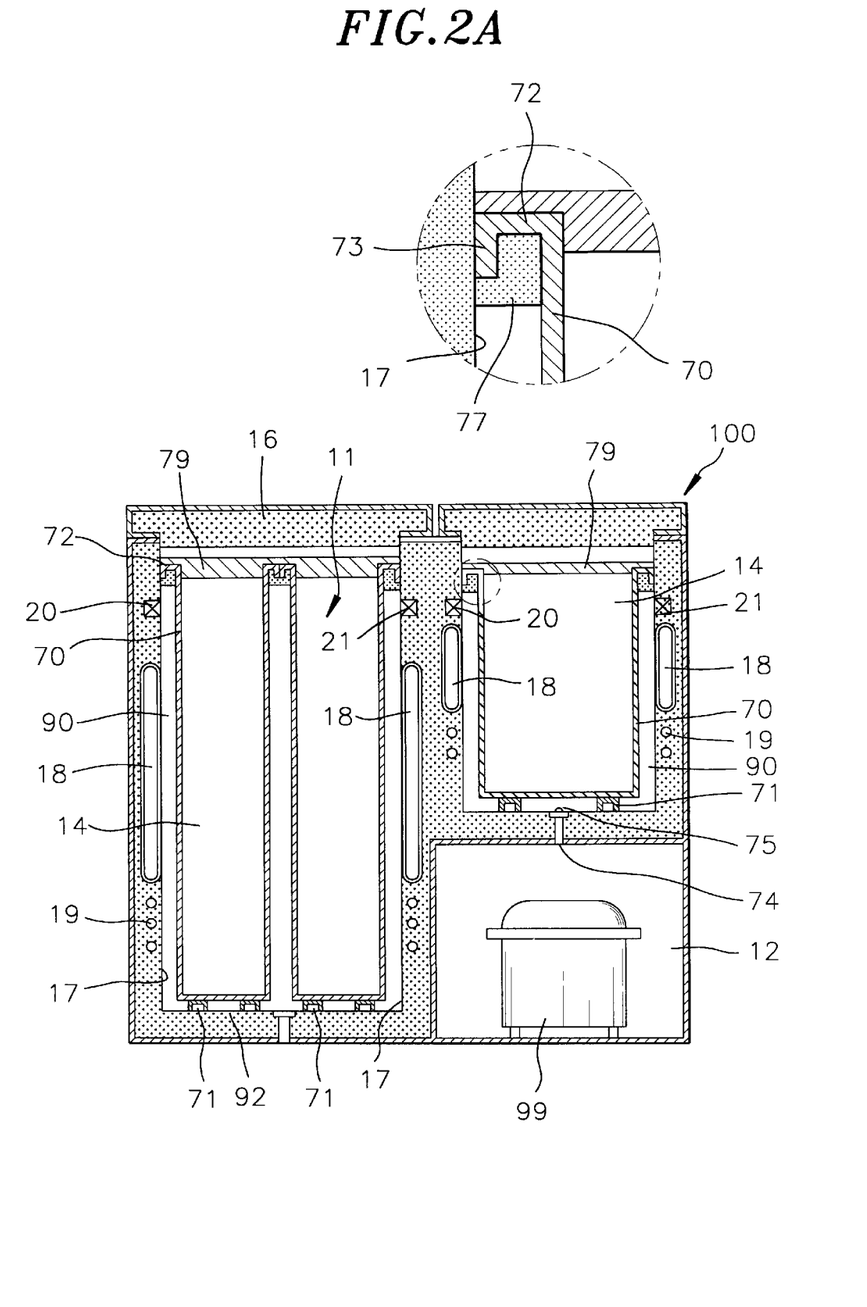
FIG. 2A offers a cross sectional view of a kimchi storage device in accordance with a first embodiment of the present invention.
Figure 2B:
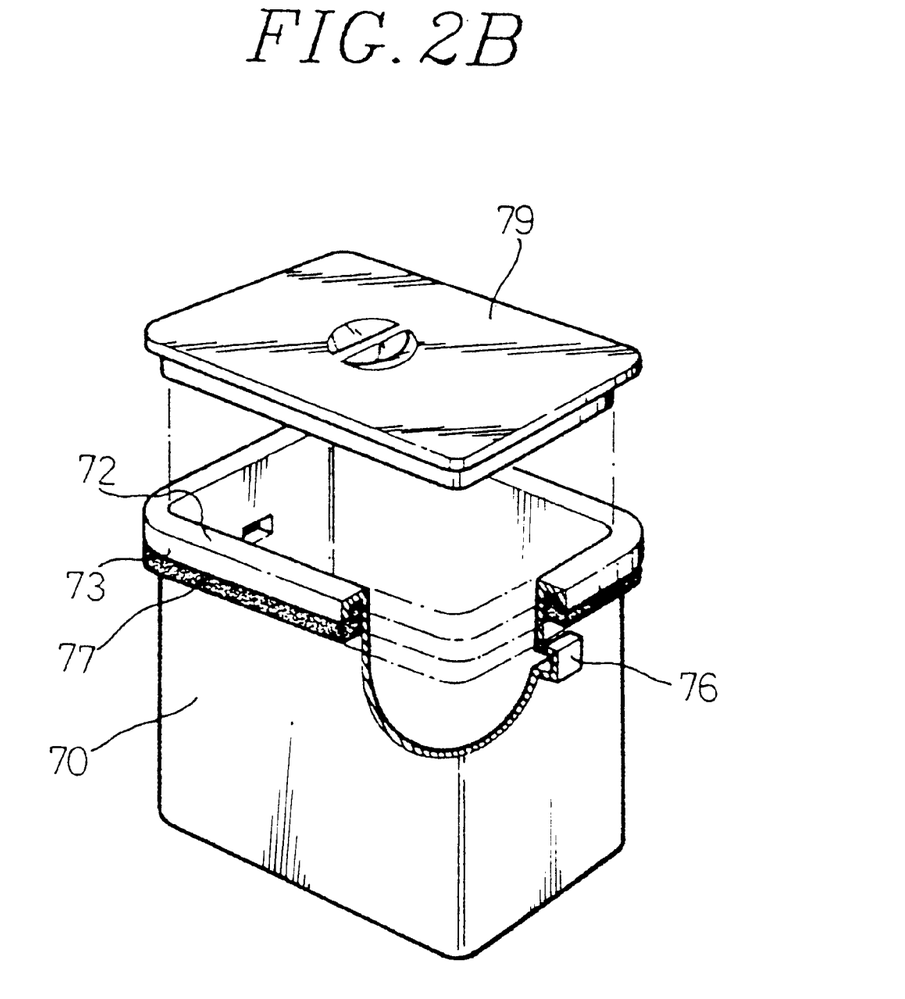
FIG. 2B presents a perspective view of a kimchi storage case used in the kimchi storage device shown in FIG. 2A.

There is shown in FIG. 2A a cross sectional view of a kimchi storage device 100 in accordance with a first embodiment of the present invention capable of fermenting kimchi expeditiously, and of functioning, once kimchi has been adequately fermented, as a cold storage for kimchi, slowing down further fermentation thereof and keeping kimchi from going sour, i.e., oxidizing. The inventive kimchi storage device 100 includes a main body 11 provided with a refrigeration chamber 12 containing a refrigeration unit 99 at a lower portion 13 thereof and a plurality of kimchi storage chambers 14, wherein each of the kimchi storage chambers 14 is further provided with a door 16 on a top portion thereof, a kimchi storage case 70 having a top cover 79, an evaporator 18 and a heater 19 on inner side walls 17 thereof, a control unit(not shown), and at least one high and one low temperature sensors 20, 21. For the sake of simplicity, only a pair of kimchi storage chambers 14 are shown in FIG. 2A and the following description of the first embodiment is for the kimchi storage device 100 having only two kimchi storage chambers. A water way 74 is also provided at a bottom portion of the kimchi storage chamber 14 for water to flow therethrough during cleaning thereof, the water way 74 being opened and shut by using a stopper 75. There is shown in FIG. 2B a perspective view of the kimchi storage case 70. The kimchi storage case 70 is upheld by a support 71 in such a way that there exits a gap 90 between the kimchi storage case 70 and the inner side wall 17 and a bottom surface 92 of the kimchi storage chamber 14, allowing cold or hot air to flow therebetween, wherein each of the kimchi storage cases 70 is provided with an isolating part 72 along the upper edges thereof.

Figure 3:
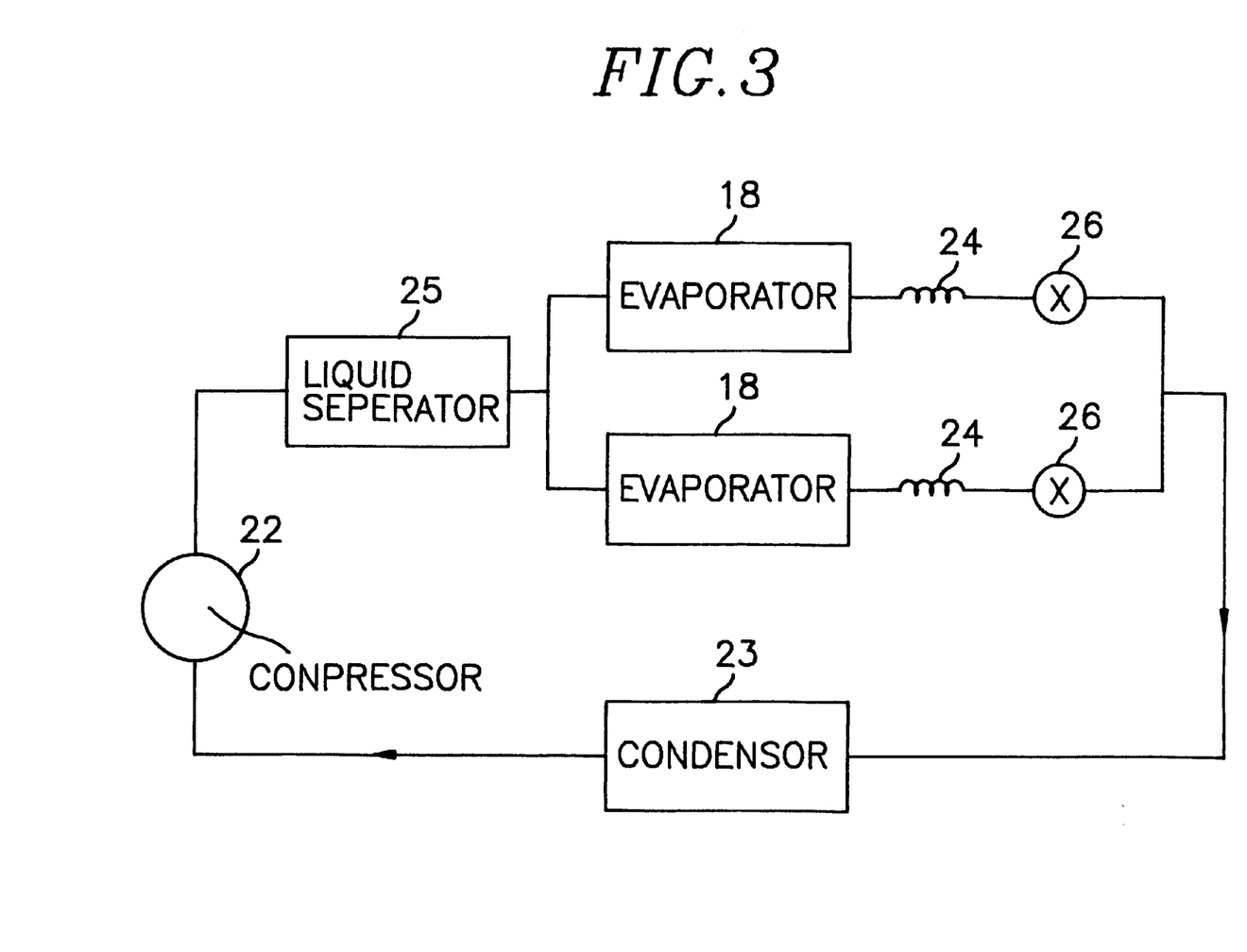
FIG. 3 shows a schematic block diagram of the refrigeration unit, including an evaporator, in the inventive kimchi storage device shown in FIG. 2A.

The isolating part 72 is shaped in such a way that a close adhesive part 73 is formed as an integral part thereof with a view to increasing the contact surface area between the inner side walls of the respective kimchi storage chamber 14 and the isolating part 72, thereby preventing cold air from escaping. In addition, a packing 77 is inserted into a groove formed between the close adhesive part 73 and the isolating part 72 to further enhance the air tightness between the inner side walls of the kimchi storage chamber 14 and the kimchi storage case 70. A pair of grips 76 are located on two opposite sides of the kimchi storage case 70 for easy removal thereof from the kimchi storage chamber 14. The evaporator 18 in each of the kimchi storage chambers 14 is connected to the refrigeration unit 99 in such a way that the evaporator 18 in each kimchi storage chamber 14 operates independently of the evaporators in the other kimchi storage chambers. To provide a cold storage function, the inventive kimchi storage device 100 is equipped with a compressor 22, a condenser 23, an expansion valve(not shown) or capillary tube(not shown), the evaporator 18 in each of the kimchi storage chambers 14, a pair of pressure reducing elements 24, a liquid separator 25 and a pair of solenoid valves 26, as shown in FIG. 3. In the inventive kimchi storage device 100, one end of the evaporator 18 in each of the kimchi storage chambers 14 is connected to one of the pressure reducing elements 24, which, in turn, is connected to one of the solenoid valves 26, and the other end of the evaporator 18 is connected to the liquid separator 25. Each of the solenoid valves 26 is connected to the condenser 23, the condenser 23 being, in turn, connected to the compressor 22, and the compressor 22 being, in turn, connected to the liquid separator 25 to thereby form a closed path through which a refrigerant flows. Each of the solenoid valves 26 is installed between the condenser 23 and each of the pressure reducing elements 24 to allow each of the kimchi storage chambers 14 to be operated independently from one another by simply opening or closing the respective solenoid valve 26, and the liquid separator 25 is set up between the evaporator 18 and the compressor 22 so as to prevent the refrigerant from flowing into the compressor 22 when the evaporators 18 are operated simultaneously or only one evaporator 18 is operated. The evaporator 18 in each of the kimchi storage chambers 14 extract heat therefrom to thereby keep inside thereof at a desired temperature, e.g., 0° C. The arrow shown in FIG. 3 indicates the direction in which the refrigerant flows.

To provide a fast fermenting function, each of the kimchi storage chambers 14 is provided with the heater 19 on an inner side wall 17 thereof, as shown in FIG. 2A. The heater 19 in each of the kimchi storage chambers 14 raises the temperature inside the respective kimchi storage chamber 14 to a desired temperature, e.g., 20° C.

A uniform cooling or heating is obtained in each of the kimchi storage chambers 14 in the first embodiment through natural convection, by placing the evaporator 18 and the heater 19 near the top portion and near the bottom portion of each kimchi storage chamber 14, respectively. To further facilitate the natural convection, the evaporator 18 and the heater 19 are designed in such a way that the portion of the evaporator 18 near the top portion of the kimchi storage chamber 14 has a larger evaporation surface than that of the evaporator 18 close to the heater 19 and the portion of the heater 19 near the bottom portion of the kimchi storage chamber 14 has a larger heating surface than that of the heater 19 close to the evaporator 18.

Figure 4:
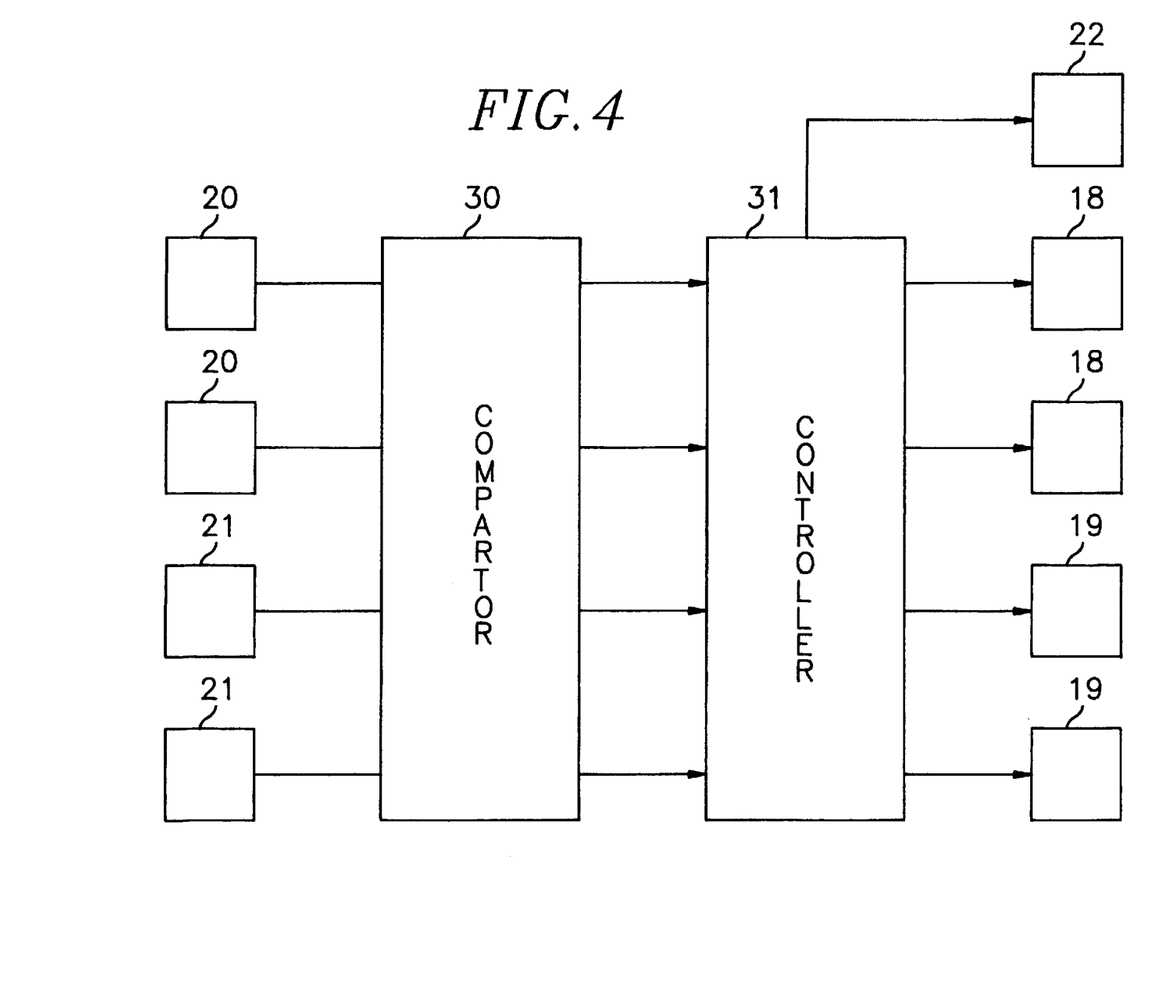
FIG. 4 depicts a block diagram of the control unit in the kimchi storage device shown in FIG. 2A.

The cold storage function and the fast fermenting function of the kimchi storage device 100 are controlled by the control unit depicted in FIG. 4, which includes the low temperature and high temperature sensors 20, 21 installed in each of the kimchi storage chambers 14, a comparator 30 for outputting a high or a low logic signal by comparing the temperature inside the kimchi storage chambers 14 obtained using the sensors 20, 21 with a preset value, and a controller 31 for outputting an appropriate output logic signal obtained based on the output signal from the comparator 30. The output from the controller 31 controls the compressor 22, and hence the evaporator 18, and the heater 19 in each of the kimchi storage chambers 14, thereby enabling the kimchi storage device 100 to provide the cold storage function and the fast fermenting function.

Figure 5A:
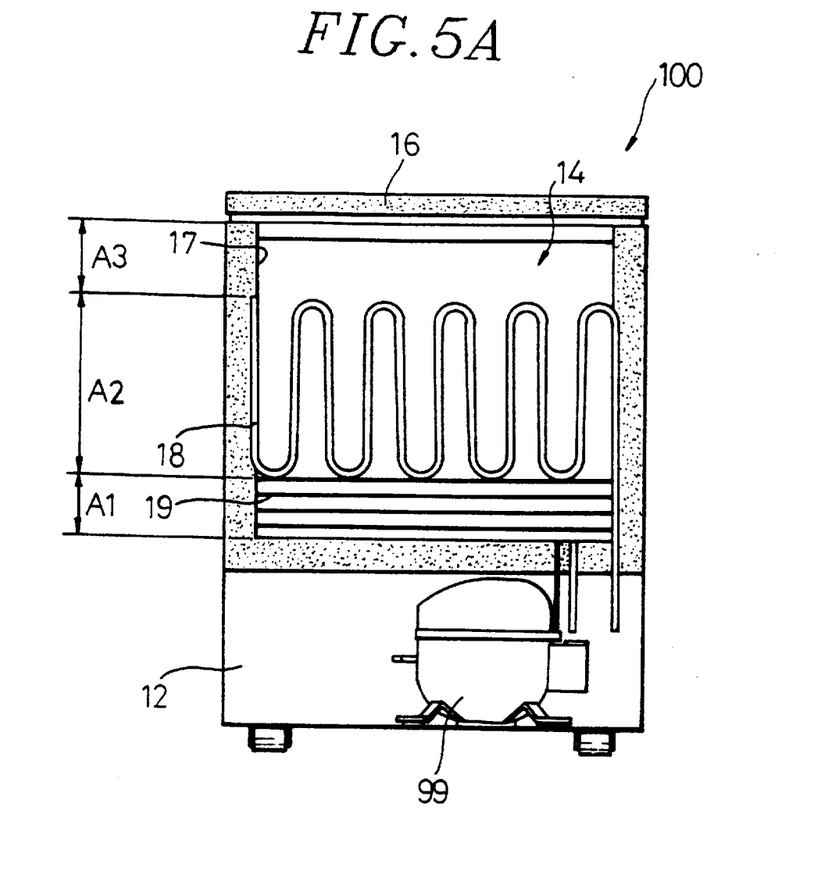
FIG. 5A provides a cut away side view of a kimchi storage chamber of the inventive kimchi storage device explaining the evaporator and the heater incorporated therein.

FIG. 5A is a side view of the kimchi storage chamber 14 of the present invention incorporating therein the evaporator 18 and the heater 19.

Figure 5B:
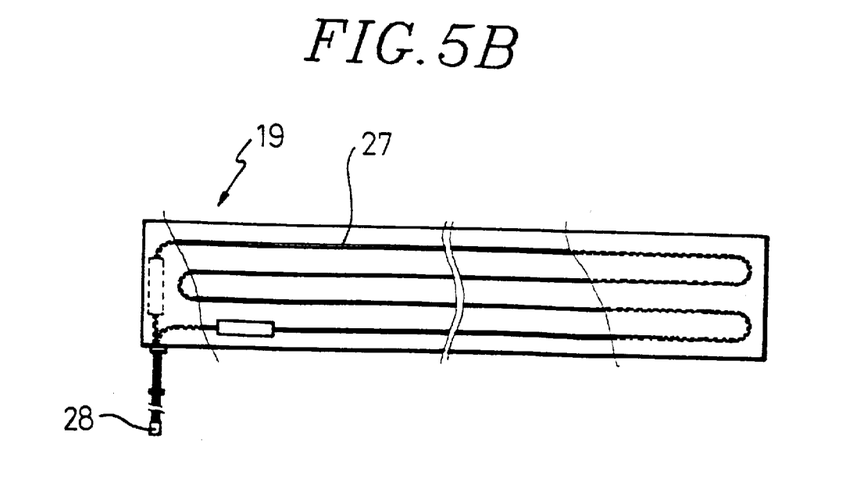
FIG. 5B sets forth a detailed view of the heater incorporated in the kimchi storage chamber shown in FIG. 5A.

The heater 19 and the evaporator 18 in each of the kimchi storage chamber 14 cover the inner side walls 17 thereof in a predetermined manner in order to maximize the natural convection and minimize the temperature fluctuation inside each thereof. The optimum ratio among the portion A2 of the inner side walls covered by the evaporator 18, the portion A3 of the inner side walls free of the evaporator 18 or the heater, and to the portion Al of the inner side walls covered by the heater 19 is approximately 2:1:1. Under this condition, the cold storage function and the fast fermenting function of the inventive kimchi storage device 100 are at their optimum. There is illustrated in FIG. 5B a detailed view of the heater 19 incorporated in each of the kimchi storage chambers 14 including a heating element 27 and a connector 28.

The uneven souring or freezing of kimchi is prevented because the inner side walls 17 of the kimchi storage chamber 14 are separated from the kimchi storage case 70 by the gap 90, and thus more uniform temperature can be maintained inside the kimchi storage case 70. In other words, kimchi inside the kimchi storage case 70 never comes into a direct contact with the evaporator 18 or the heater 19, preventing the uneven oxidation or freezing thereof.

Figure 6A:
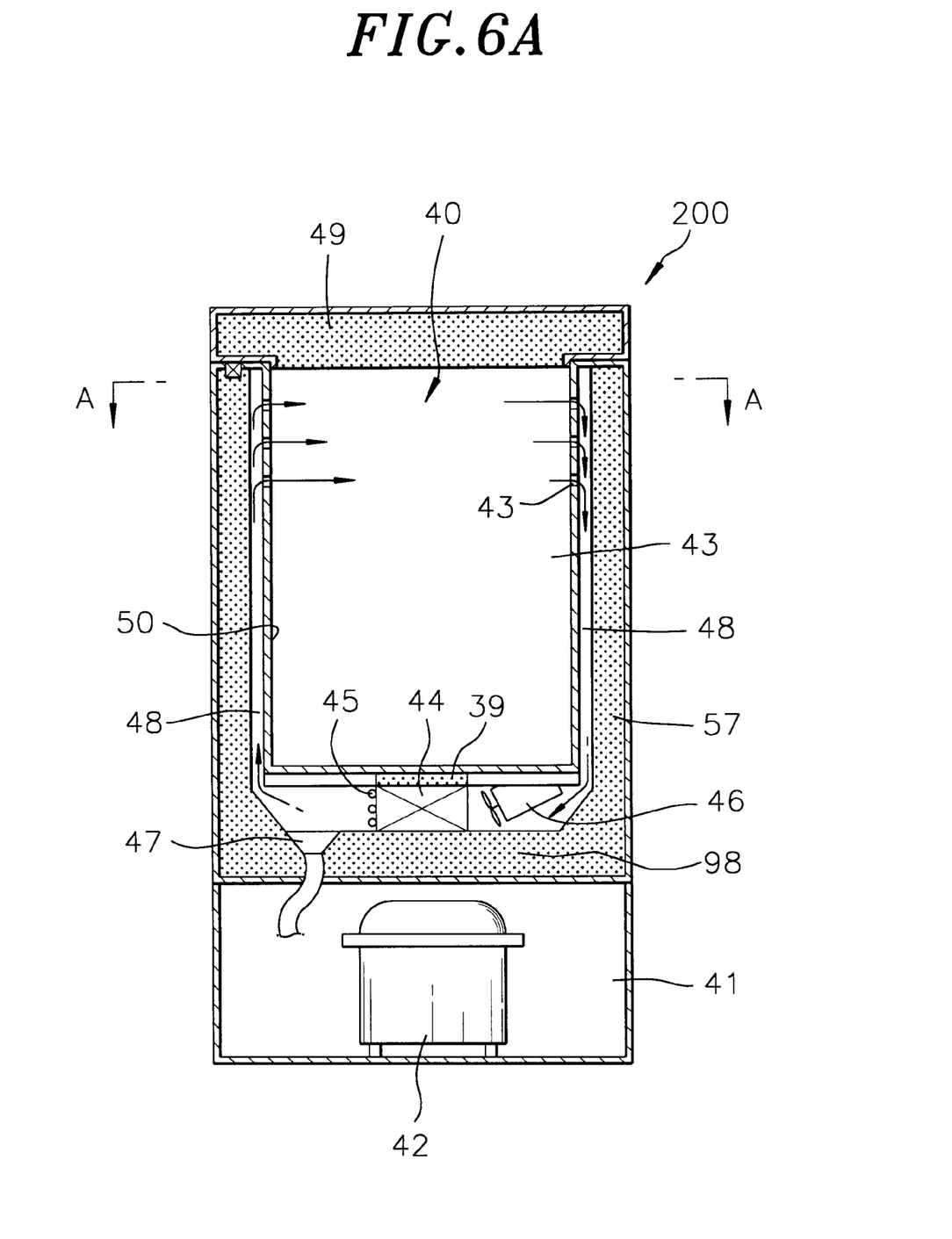
FIG. 6A exemplifies a cross sectional view of a kimchi storage device in accordance with the second embodiment of the present invention.
Figure 6B:
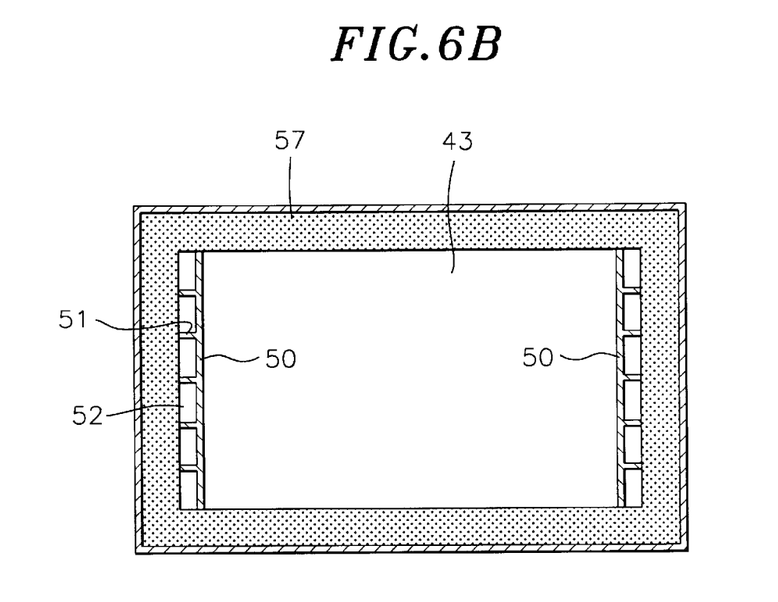
FIG. 6B describes a sectional view of the kimchi storage device taken along the line A—A in FIG. 6A.

FIG. 6A is a cross sectional view of a kimchi storage device 200 in accordance with the second embodiment of the present invention, and FIG. 6B is a top view of the second embodiment taken along the A—A line in FIG. 6A.

The inventive kimchi storage device 200 includes a main body 40 provided with a refrigeration chamber 41, located at a lower portion thereof and containing a refrigeration unit 42, a plurality of kimchi storage chambers 43, an evaporator 44, a heater 45, a blow motor 46, an exhaust port 47, an air passage 48, a door 49 on a top portion thereof, and an air guiding plate 50, wherein the air guiding plate 50 is located at a fixed distance from the inner side and bottom walls 57, 98 of the main body 40 to form the air passage 48 and at the same time define the kimchi storage chamber 43, the evaporator 44 is connected to the refrigeration unit 42 in the refrigeration chamber 41 located below the air passage 48 at the lower portion of the kimchi storage device 200, the heater 45 is installed at one side of the evaporator 44, and a blow motor 46 for forcing the air to flow through the air passage 48 is installed at the opposite side of the heater 45. For the sake of simplicity, the inventive kimchi storage device 200 shown in FIG. 6A has only one kimchi storage chamber 43, and the following description of the inventive kimchi storage device will be given with respect to such. The arrows shown in FIG. 6A indicate the direction of air flow.

As shown in FIG. 6B, a plurality of dividing plates 51 and a corresponding number of penetration holes 52 are formed at an upper portion of the air passage 48, i.e., the corresponding kimchi storage chambers 45, to force cold or hot air thereinto.

Furthermore, an insulator 39 is located between the above mentioned evaporator 44 and a bottom surface of the corresponding kimchi storage chamber 43, and the exhaust port 47 is located at the lower portion of the kimchi storage chamber 43.

Figure 6C:
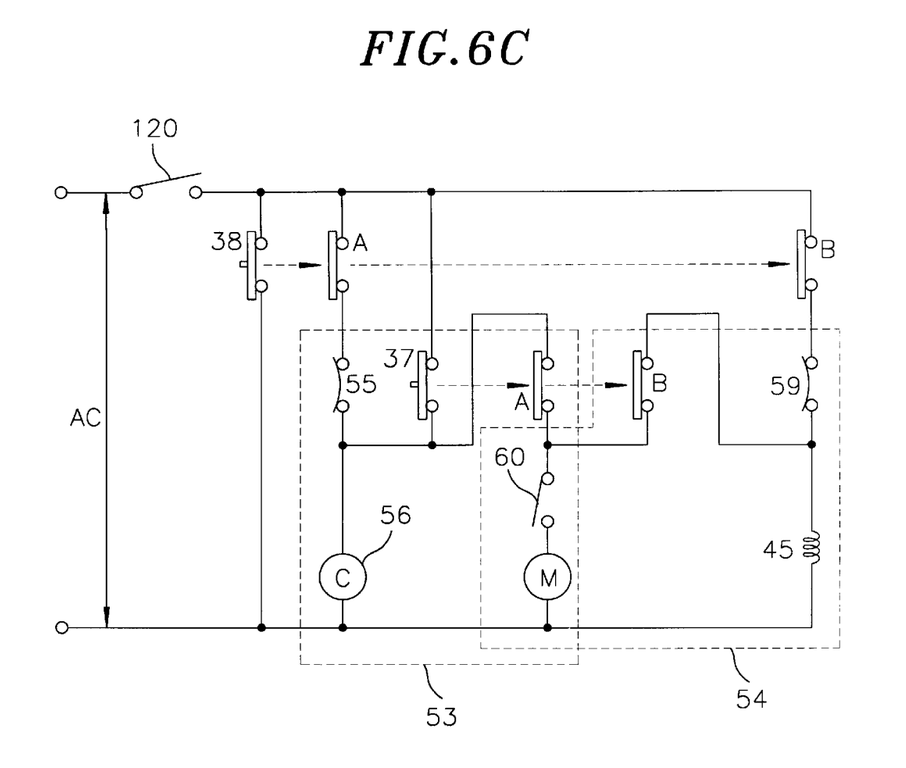
FIG. 6C represents a circuit diagram of the control unit of the kimchi storage device shown in FIG. 6A.

The evaporator 44, heater 45, and the blow motor 46 of the second embodiment are controlled by a controller(not shown) including a cold storage function control unit 53 and a fast fermenting function control unit 54, and a circuit diagram thereof is shown in FIG. 6C.

When a power switch 120 is switched on, either one of the point contacts A, B is optionally connected through a first relay 38 to operate in the cold storage function control unit 53 or the fast fermenting function control unit 54.

The cold storage function control unit 53 includes a low temperature controlling switch 55, a compressor 56 in the refrigeration unit 42, and a blow motor 46 connected parallel to the compressor 56. If the contact A is connected, electrical power is supplied to the compressor 56 and the blow motor 57, thereby forcing cold air to circulate through the air passage 48.

When the temperature inside the kimchi storage chamber 43 reaches or falls below a preset value, the temperature controlling switch 55 becomes open-circuited, thereby turning off the compressor 56 and the blow motor 46.

The door 49 is provided with a door switch 60 located between the door 49 and the main body 40, as shown in FIG. 6A, and is electrically connected to the blow motor 57 in such a way that, when the door 49 is opened, it causes an open-circuit, which, in turn, stops the blow motor 57, thereby preventing cold air or hot air from circulating and minimizing heat loss through the door 49.

The fast fermenting function control unit 54 is made up of the heater 45, a high temperature controlling switch 59 and the blow motor 46. If the contact B is connected, an electrical power is supplied to the heater 45 and the blow motor 57 is turned on, forcing hot air to circulate through the air passage 48, raising the temperature inside the kimchi storage chamber 43 to a desired level, thereby accelerating the fermenting of kimchi. When the temperature inside the kimchi storage chamber 43 reaches a preset value, the high temperature controlling switch 59 becomes open-circuited and, as a result, the heater 45 and the blow motor 46 are turned off.

Furthermore, a second relay 37 for preventing a counter current from flowing is installed between the low temperature controlling switch 55 and the door switch 60, and between the high temperature controlling switch 59 and the door switch 60, respectively.

In the inventive kimchi storage device 200, since direct cooling and heating are utilized, the cooling and heating times are shorter than those of the first embodiment and a more uniform temperature profile can be obtained, which, in turn, may reduce the occurrence of local oxidation and freezing of kimchi.

Figure 7A:
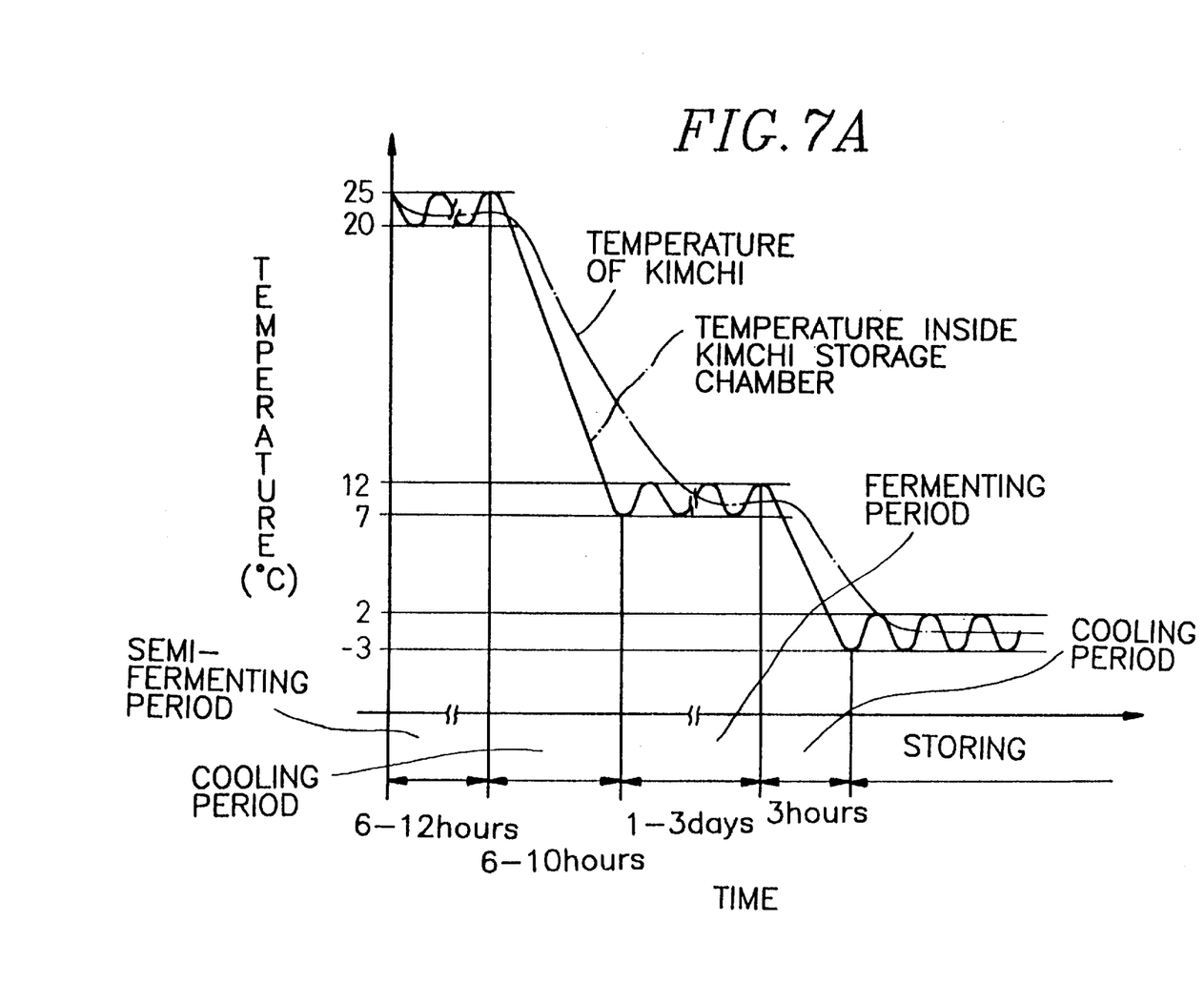
FIG. 7A charts a graph explaining a first kimchi fermentation method in accordance with the present invention.
Figure 7B:
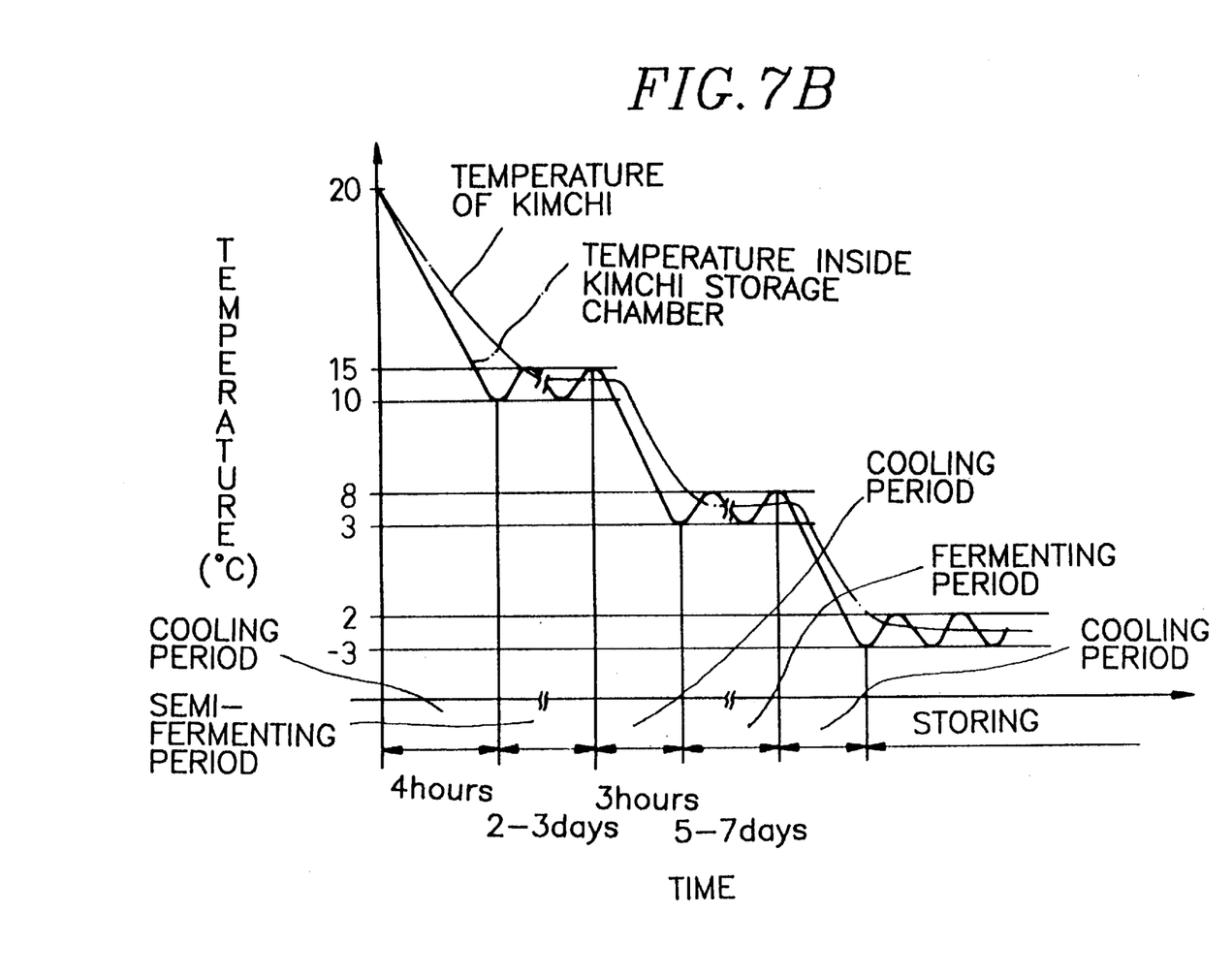
FIG. 7B constitutes a graph describing a second kimchi fermentation method in accordance with the present invention.

There are graphically illustrated in FIGS. 7A and 7B a first and a second methods for fermenting a freshly made kimchi, and for storing it, once it has been adequately fermented, respectively. The solid line in FIGS. 9A and 9B indicates the temperature change inside the kimchi storage chamber, and the broken line, the temperature change of kimchi. As illustrated in FIGS. 7A and 7B, an optimum method for fermenting and storing the freshly made kimchi basically includes the following three stages: (1) semi-fermenting; (2) completely fermenting; and (3) storing. The freshly made kimchi is semi-fermented, fermented and stored under the following conditions in accordance with the first method: (a) holding the freshly made kimchi at a temperature ranging from 20° C. to 25° C. for 6–12 hours, thereby semi-fermenting it; (b) holding the semi-fermented kimchi at a temperature ranging from 7° C. to 12° C. for 1 to 3 days, thereby completely fermenting it; and (c) storing the fermented kimchi by holding it at a temperature ranging from 2° C. to −3° C.

In the first method, there is an associated cooling period between two successive steps, as indicated in FIG. 7A.

In contrast to the first method, the freshly made kimchi in the second method, as illustrated in FIG. 7B, is first cooled down, semi-fermented, cooled down further, completely fermented, and then stored. The semi-fermentation and fermentation temperatures are lower in the second method than in the first method, and, consequently, it takes longer time to semi-ferment and completely ferment. The temperature and time required for semi-fermenting, completely fermenting and storing for the second method are as follow: (a) holding the freshly made kimchi at a temperature from 10° C. to 15° C. for 2 to 3 days to semi-ferment it; (b) holding the semi-fermented kimchi at a temperature ranging from 3° C. to 8° C. for 5 to 7 days to completely ferment it; and (c) storing the fermented kimchi by holding at a temperature ranging from 2° C. to −3° C. Again there is an associated cooling period between two successive steps, as illustrated in FIG. 7B.

Figure 8A:
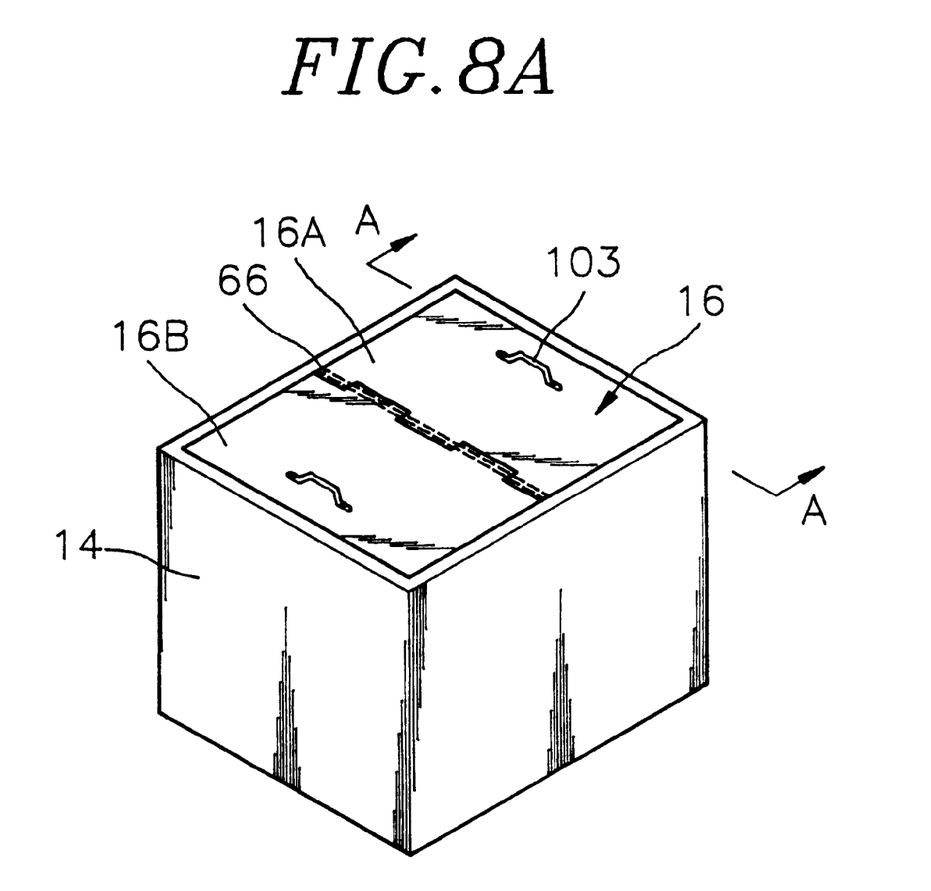
FIGS. 8A to 8G illustrate various views of one embodiment of a door for the kimchi storage chamber incorporated in the present invention.
Figure 8B:
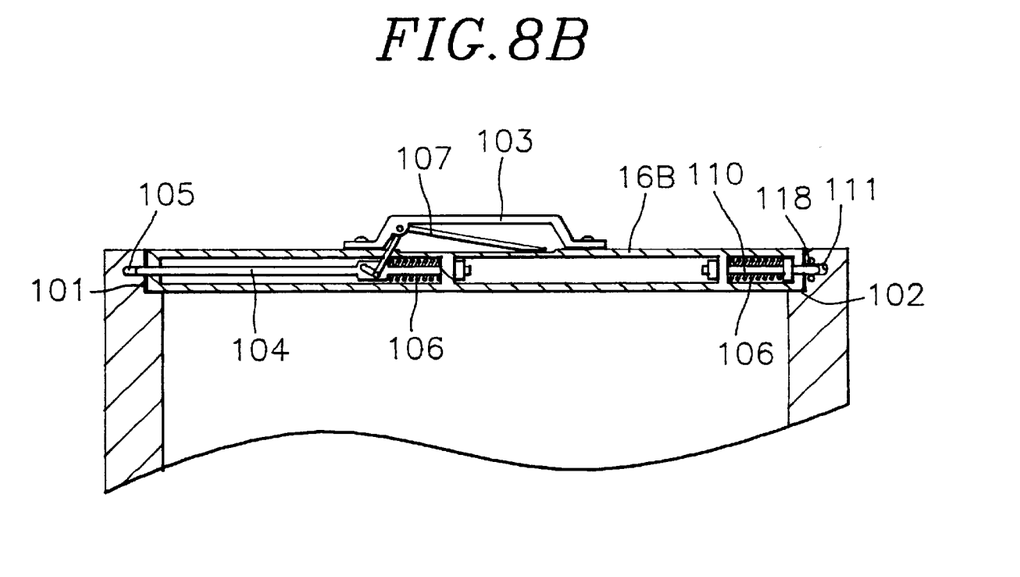
Figure 8C:
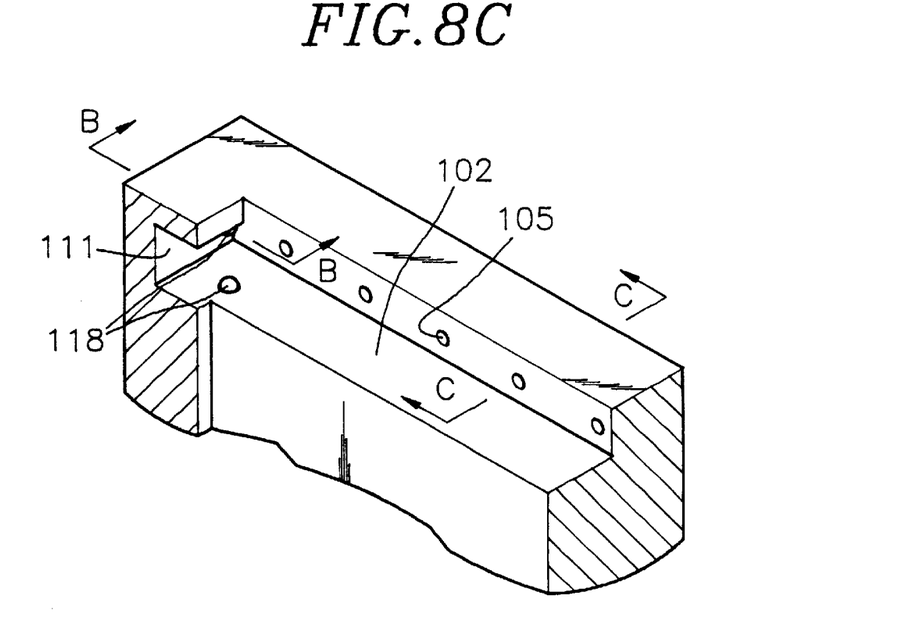

There are illustrated in FIGS. 8A to 8G various views of one embodiment of the door 16 incorporated in the kimchi storage chamber 14. Referring to FIGS. 8A to 8B, the door 16 includes a first and a second parts 16A, 16B connected mechanically to each other by a reciprocal hinge 66, wherein each of the parts 16A, 16B is supported by a pair of guide rails 101, 102 located on two opposite inner side walls at the upper portion of the kimchi storage chamber 14 and each thereof is provided with a grip 103. Further, each of the first and the second parts 16A, 16B has a locking means and a hinge-supported means used for opening and shutting them, wherein the locking means is located at one edge of the first and the second parts 16A, 16B and is used for fixing or releasing thereof, and the hinge-supported means is located opposite to the locking means and supports a rotational movement when either one of the first and the second parts 16A, 16B is open.

The operation of the door 16 will be described using the second part 16B. A set of latching holes 105 are formed on an inner wall of the guide rail 102 and a matching set thereof are formed on the inner wall of the guide rail 103 located on the inner side wall opposite from the guide rail 102. Two opposite ends of a fixing axis 104 are inserted into a pair of matching latching holes 105 by a spring 106 operating elastically in the direction of the insert. A lever 107 with its one edge moving peristaltically to the fixing axis 104 is set up so as to rotate to form the locking means. The two opposite ends of the fixing axis 104 are inserted into the pair of matching latching holes 105 by manipulating the lever 107 installed at the grip 103. Thus, the second part 16B can be fixed to and released from the kimchi storage chamber 14.

Figure 8D:
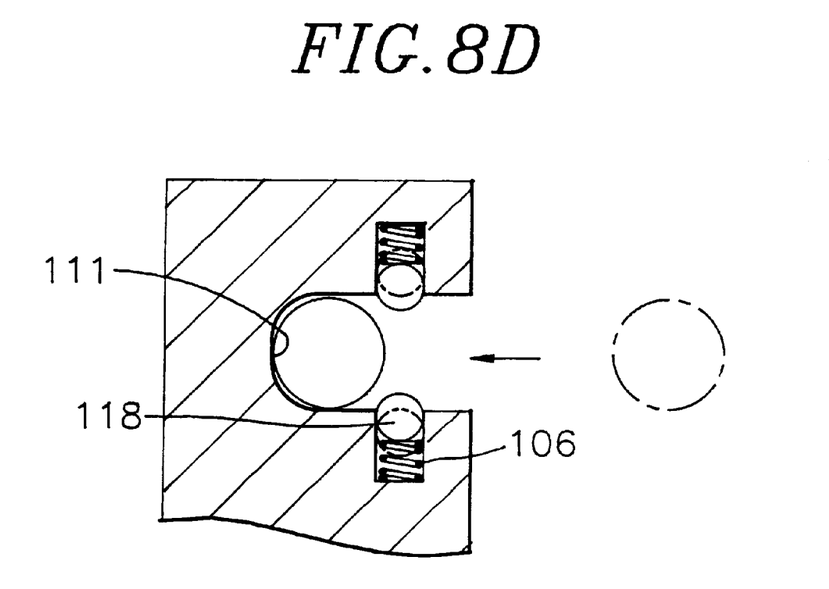

In the hinge-supported means, as depicted in FIGS. 8B and 8D, the hinge-supported axis 110 is installed in the opposite side of the locking means, and is also provided with a support guide groove 111 for supporting the insertion thereof into the edge of the guide rail 102 located in the opposite side. A ball 118 which appears and disappears by the action of the spring 106 is installed in the upper and the lower parts of the guide groove 101, respectively, to suspend or release the hinge-supported axis 110.

As shown in FIG. 8A, the second part 16B can be opened completely by holding the grip 103 tightly thereon which will, in turn, pull the lever 107 of the locking means located in this grip 103, compressing the spring 106, moving the fixing axis 104 toward center, thereby releasing the second part 16B.

Figure 8E:
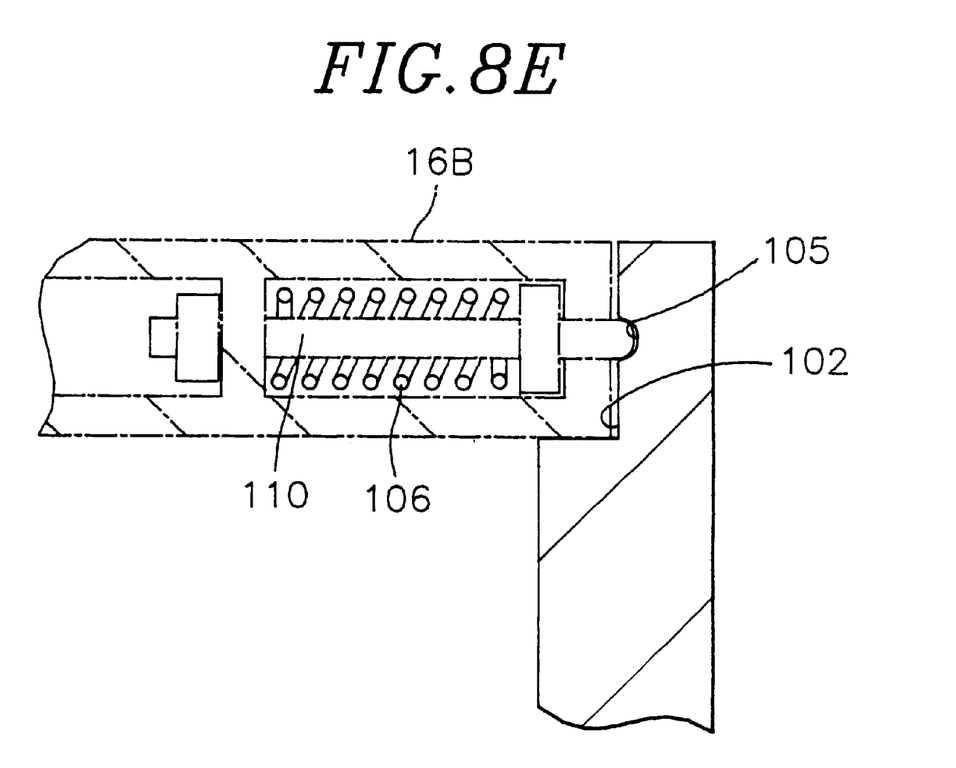
Figure 8F:
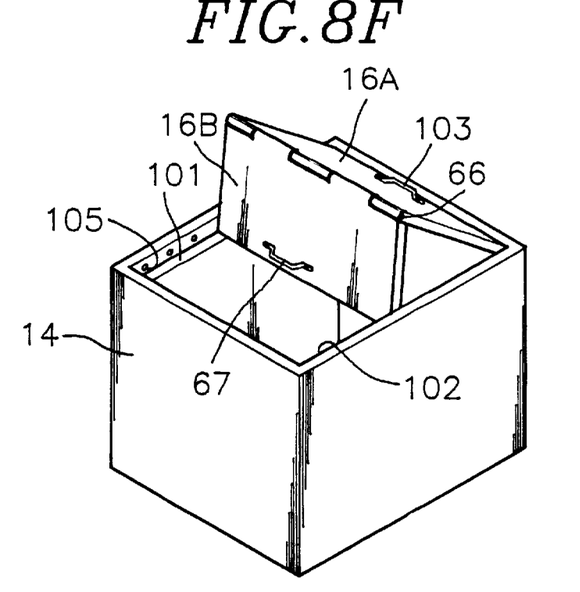
Figure 8G:
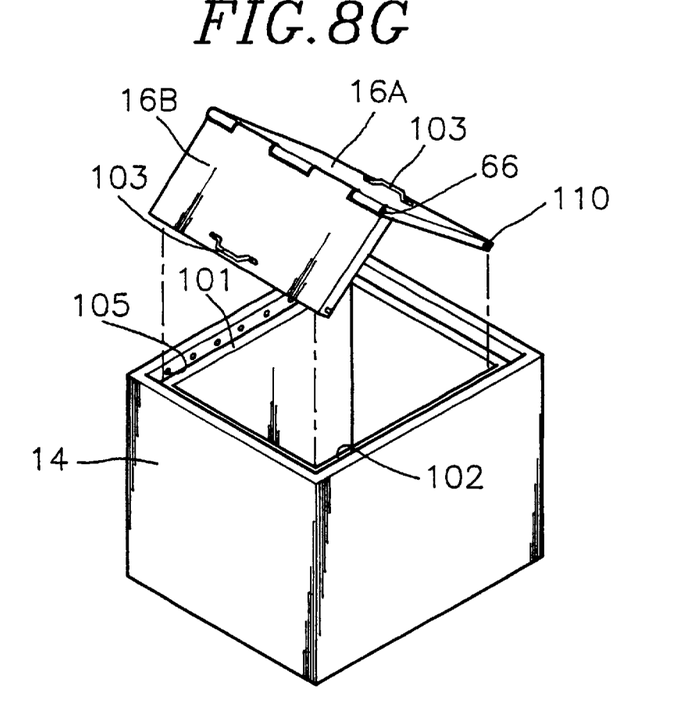

When the second part 16B moves along the pair of guide rail 101, 102, the first and the second parts 16A, 16B are bent by the action of the hinge 66 located therebetween as a result of the first part 16A rotating around the fixing axis 104 of the locking means and the hinge-supported axis 110 of the hinge-supported means, since they are in the state of conjunction with the kimchi storage chamber 14 by the locking means and the hinge-supported means located in the two opposite ends of the first part 16A, as depicted in FIG. 8F.

In order for the second part 16B is kept to be open in the above described situation, the fixing axis 104 of the second part 16B located on the nearest latching hole 105 on the guide rail 101, and the lever 107 of manipulating grip 103 must be released, moving the fixing axis 104 by a restoring force of the compressed spring 106. Meanwhile, the hinge-supported axis 110 of the hinge-supported means of the second part 16B located in the opposite side of the locking means is, as shown in FIG. 8E, kept suspended on the suspension groove 113.

The amount of the second part 16B opening can be modulated by choosing an appropriate pair of latching holes 105 or suspension grooves 113 among several holes or grooves on the pair of guide rails 101, 102.

Because the door 16 has the locking means and the hinge-supported means in both the first and the second parts 16A, 16B, the first part 16A can be opened in the same manner as the second part 16B. The door 16 also allows either one of the first part 16A and the second part 16B to be optionally opened.

The first and the second parts 16A, 16B, and hence the door 16, can be closed by reversing the procedure for opening thereof.

Although the kimchi storage device having only one kimchi storage chamber is used for describing the door 16, the present embodiment, i.e., door 16, can also be used in the kimchi storage device having a plurality of kimchi storage chambers.

While the present invention has been described with respect to certain preferred embodiments only, other modifications and variations may be made without departing from the scope of the present invention as set forth in the following claims.

What is claimed is:

1. A kimchi storage device comprising:

a main body including a refrigerating unit on a bottom portion thereof and a plurality of kimchi storage chambers provided with a kimchi storage case being upheld by a support in such a way that there exists a gap between the kimchi storage case and the inner side walls and a bottom surface of each of the kimchi storage chambers, thereby allowing cold air to flow therebetween, the kimchi storage case having an isolating part along upper edges thereof, the isolating part including a close adhesive part as an integral part thereof coming in direct contact with the inner side walls of the kimchi storage chamber;

a door for each of the kimchi storage chambers;

at least one high temperature sensor and one low temperature sensor for each of the kimchi storage chambers; an evaporator installed on an inner side wall of each of the kimchi storage chambers;

a heater installed on an inner side wall in each of the kimchi storage chambers; and a control unit for controlling the heater and the evaporator in each of the kimchi storage chambers.

2. The kimchi storage device of claim 1, wherein a packing is inserted into a groove formed between the close adhesive part and the isolating part.

3. The kimchi storage device of claim 1 is further provided with a water way at a bottom portion thereof.

4. The kimchi storage device of claim 1, wherein the evaporator and the heater in each of the kimchi storage chambers are placed on a top and a bottom portions thereof, respectively.

5. The kimchi storage device of claim 4, wherein a portion of the evaporator near the top portion of the kimchi storage chamber has a larger evaporation surface than that of the evaporator near the heater.

6. The kimchi storage device of claim 5, wherein a portion of the heater near the bottom portion of the kimchi storage chamber has a larger heating surface than that of the heater close to the evaporator.

7. The kimchi storage device of claim 4, wherein the heater and the evaporator in each of the kimchi storage chambers covers the inner side walls thereof in a predetermined ratio.

8. The kimchi storage device of claim 7, wherein ratio among a portion of the inner side walls in each of the kimchi storage chambers covered by the evaporator, and a portion thereof free of the evaporator and the heater, and a portion thereof covered by the heater is approximately 2:1:1.

* * * * *